United States Patent [19]
Torrisi

[11] Patent Number: 4,974,505
[45] Date of Patent: Dec. 4, 1990

[54] FRUIT JUICE AUTOMATIC DISPENSER

[75] Inventor: Salvatore Torrisi, Catania, Italy

[73] Assignee: A.I.D. Agriculture Industrial Development S.p.A., Catania, Italy

[21] Appl. No.: 355,629

[22] Filed: May 22, 1989

[30] Foreign Application Priority Data

May 24, 1988 [IT] Italy ................... 3473 A/88

[51] Int. Cl.$^5$ ............................................. A23N 1/00
[52] U.S. Cl. .................................. 99/502; 99/504; 221/265
[58] Field of Search .............. 99/495, 496, 456, 509, 99/510, 501–505; 426/481, 489; 221/265, 105, 132; 100/35, 98 R, 116, 127, 218, 221

[56] References Cited

U.S. PATENT DOCUMENTS

| | | | |
|---|---|---|---|
| 2,065,271 | 12/1936 | Faulds | 99/502 |
| 2,278,013 | 3/1942 | Nicholson | 221/105 |
| 2,365,832 | 12/1944 | Monroe | 99/502 |
| 2,667,961 | 2/1954 | Reese et al. | 221/265 |
| 3,785,525 | 1/1974 | Handeland | 221/265 |
| 4,142,883 | 3/1979 | Dichter | 221/105 |
| 4,294,861 | 10/1981 | Ifuku et al. | 99/584 |
| 4,300,448 | 11/1981 | Hayashi et al. | 99/516 |
| 4,391,185 | 7/1983 | Stanley | 99/495 |
| 4,430,933 | 2/1984 | Boots | 99/536 |
| 4,479,424 | 10/1984 | Carroll | 100/98 R |

FOREIGN PATENT DOCUMENTS 1201104 12/1984 U.S.S.R. ................ 221/265

*Primary Examiner*—Timothy F. Simone
*Attorney, Agent, or Firm*—Guido Modiano; Albert Josif

[57] ABSTRACT

Fruit juice automatic dispenser, including a refrigerated unit for storing the fruit to be squashed, an assembly for cutting and squashing the individual citrus fruits, a station for removing a dose of squash, means for washing the squashing elements and for collecting the wash water and the peels of the citrus fruits and a control unit which controls the assemblies and is adapted to make them operate in succession when activated by a coin operated device.

39 Claims, 4 Drawing Sheets

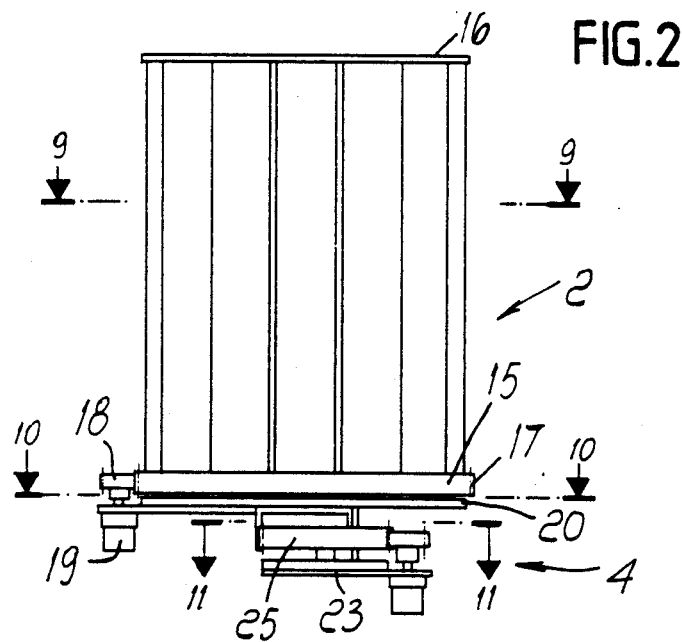
FIG. 2
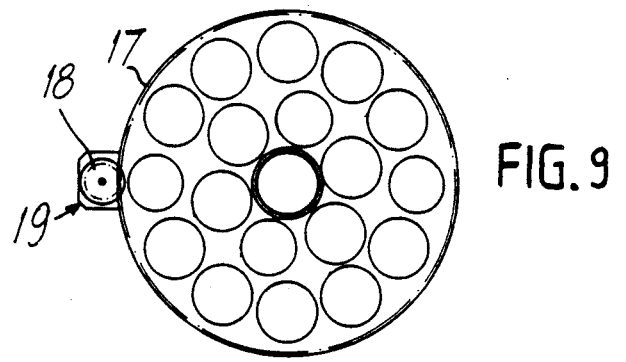
FIG. 9
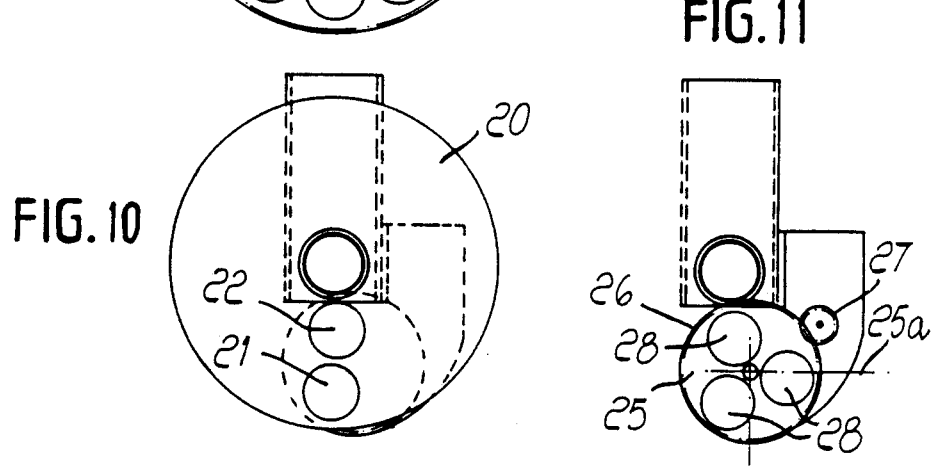
FIG. 10
FIG. 11

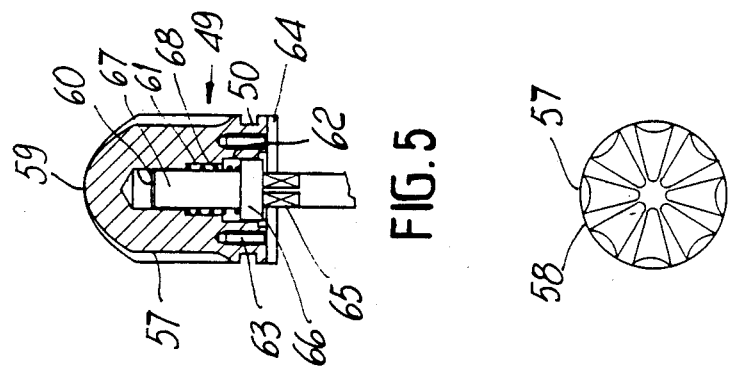
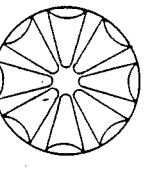
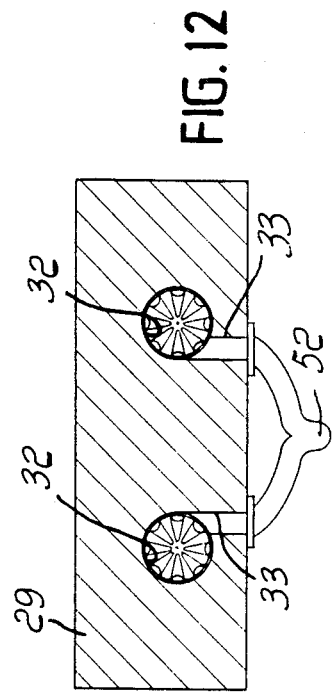
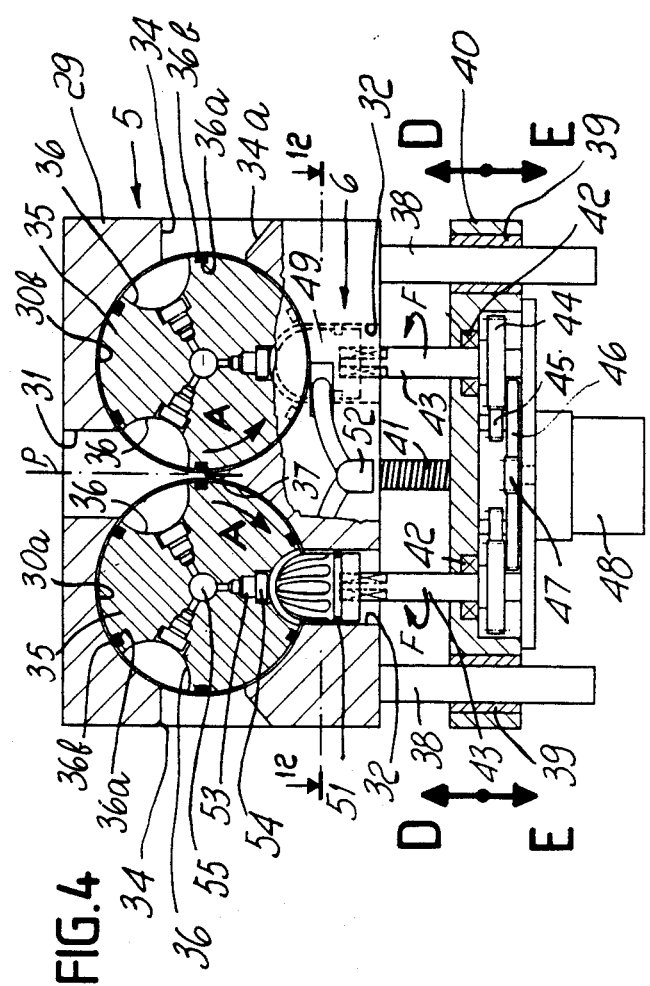

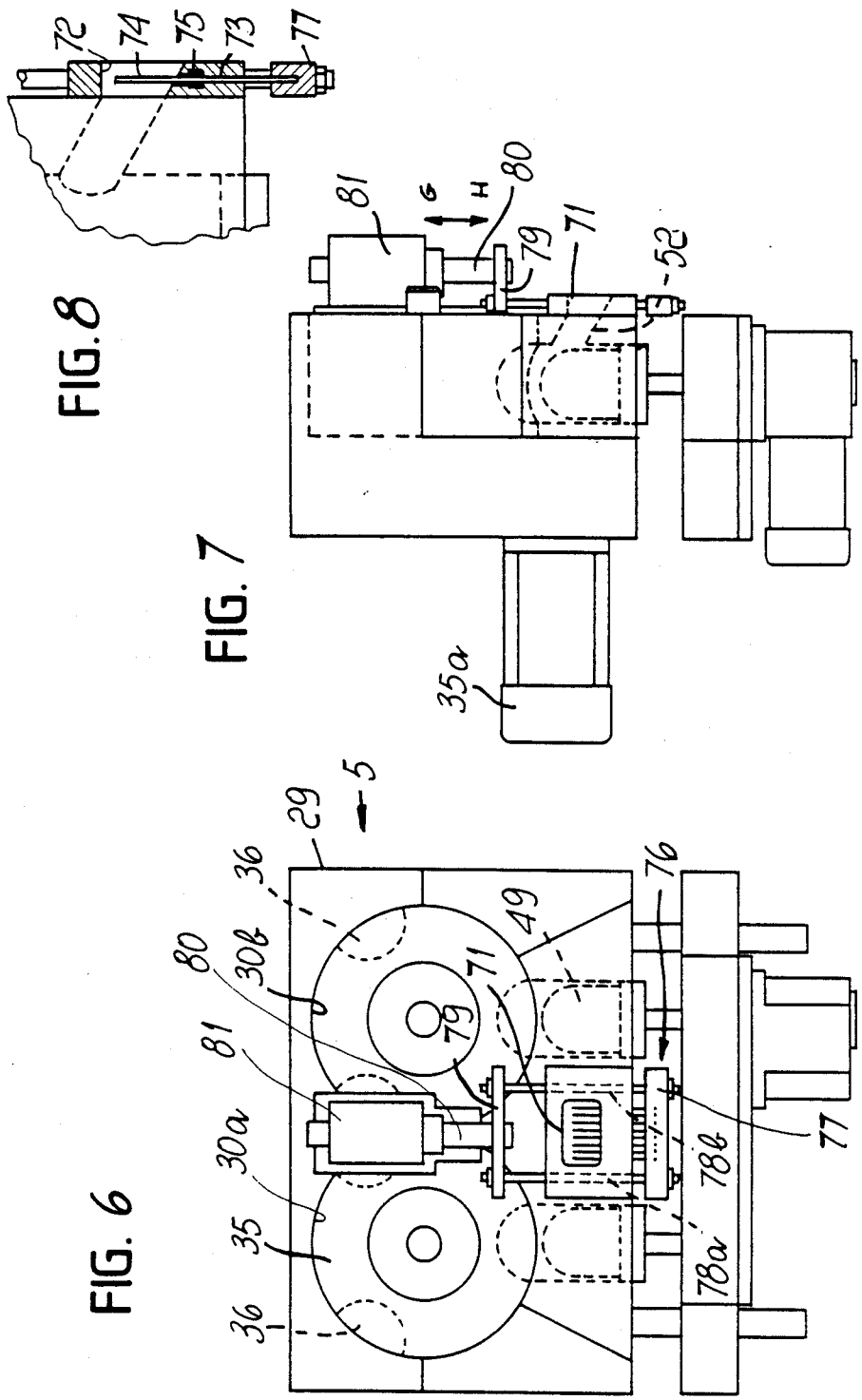

FRUIT JUICE AUTOMATIC DISPENSER

BACKGROUND OF THE INVENTION

The present invention relates to a fruit juice automatic dispenser, particularly for citrus fruit juices or squashes.

An increasingly vast number of users tends to drink natural beverages, such as for example fruit juices, and particularly citrus fruit squashes; said squashes are currently distributed in bottles or manually prepared at the moment of serving, or occasionally prepared in large amounts and stored in refrigerated dispensers, from which they are drawn when they are to be served.

Bottled juices usually have organoleptic characteristics which are negatively affected by the preservatives which must be introduced therein, while individually prepared juices are often obtained in scarcely controlled hygienic conditions; even juices prepared occasionally and stored in refrigerated dispensers have shortcomings from the hygienic point of view and in organoleptic terms due to changes in taste and color.

Another negative aspect of juices prepared on the spot is reduced autonomy, which entails the need to provide a daily supply of juice for the juice dispenser.

With reference to the above, juices must be dispensed with the nearby presence of specific personnel.

Besides this, citrus fruit juice contains, as is known, filaments, seeds and semi-solid residuals which should be eliminated in order to make the juice more pleasant to drink.

The residuals of even a small number of oranges soon give rise to a filamentous mass which must be eliminated to avoid the jamming of the ducts in which the citrus fruit juice flows: besides, one must take into account that even rather long periods of time may elapse between one squashing and the next, in the most disparate weather and environmental conditions, so that said residuals may rot, leading to bad odors, to the presence of insects, molds, bacterial colonies or the like or dry and harden and thus become difficult to remove.

SUMMARY OF THE INVENTION

The technical aim of the present invention is to obviate the above described disadvantages, i.e. to provide an automatic dispenser of citrus fruit juices which can be activated by inserting tokens or coins, which squashes the desired number of citrus fruits at the moment of serving and has considerable autonomy.

Within the scope of this technical aim, an object of the present invention is to provide a dispenser which lets the citrus fruit to be used in view, so as to make them more appetizing, and operates in optimum hygienic conditions.

The technical aim of the present invention is to provide a device which can separate the solid or semi-solid residuals from the juice and can be easily and rapidly cleaned at the end of each squashing to avoid the degradation of the hygienic conditions or an occlusion of the juice delivery ducts.

Another object of the present invention is to achieve the above described aim and objects with a simple structure which is relatively easy to execute in practice, easy to use, effective in operation and relatively modest in cost.

This aim and these objects are achieved by a fruit juice automatic dispenser, characterized in that it comprises a refrigerated storage unit for the fruits to be squashed, means for successively removing the individual fruits required to prepare a dose of squash, said fruits being arranged between said storage unit and an assembly for cutting said fruits in two halves, an assembly for squashing the half-fruits and for conveying the juice towards a removal station, means for washing the squashing assembly, means for conveying the juice and means for collecting the washing water and the peels of the squashed citrus fruits, a control unit which controls said assemblies and said means and is adapted to make them operate in succession.

BRIEF DESCRIPTION OF THE DRAWINGS

Further characteristics will become apparent and evident from the detailed description of a preferred but not exclusive embodiment of a dispenser according to the invention, illustrated only by way of non-limitative example in the accompanying drawings, wherein:

FIG. 2 is a partially sectional side view of the storage unit and of the citrus fruit removal means;

FIG. 4 illustrates a side view and a sectional plan view of the assembly for cutting the fruits into two halves and for squashing the fruit halves;

FIG. 5 illustrates a sectional side view of a squashing element;

FIG. 6 is a front view of the cutting assembly according to the invention, mounted on the dispenser;

FIG. 7 is a side view of the cutting assembly of FIG. 6;

FIG. 8 is an enlarged-scale detail view of the assembly illustrated in FIG. 7;

FIG. 9 is a section view taken along line 9—9 of FIG. 2;

FIG. 10 is a section view according to line 10—10 of FIG. 2;

FIG. 11 is a section view according to line 11—11 of FIG. 2;

FIG. 12 is a section view according to line 12—12 of FIG. 4;

FIG. 13 is a top view of the squashing element of FIG. 5.

DESCRIPTION OF THE PREFERRED EMBODIMENTS

Figure 3:
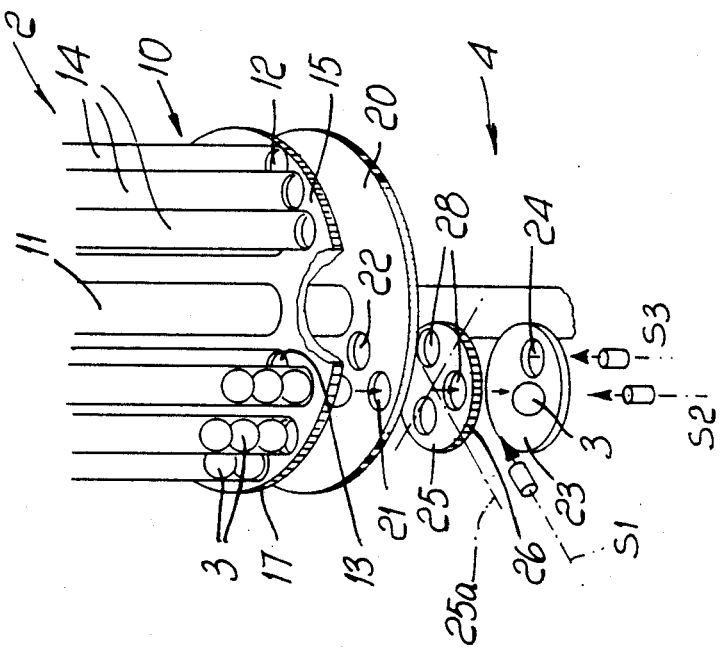
FIG. 3 is an exploded isometric view of the base of the storage unit and of the means for successively removing each fruit.
Figure 1:
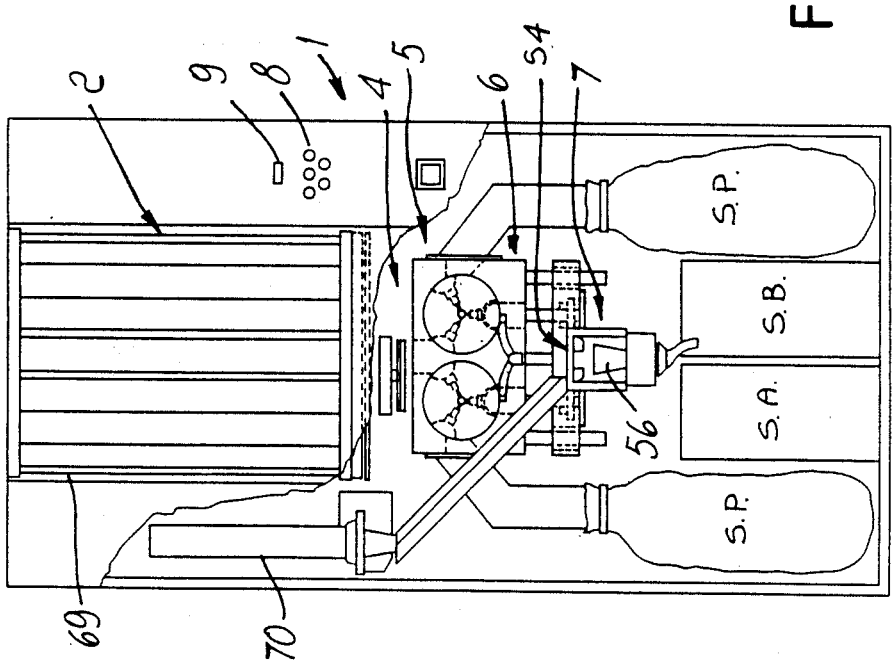
FIG. 1 is a schematic sectional front view of a dispenser according to the invention.

With particular reference to the above described figures, the reference numeral 1 generally indicates the fruit juice automatic dispenser according to the invention.

The dispenser comprises a refrigerated storage unit 2 for the fruits 3 to be squashed, means 4 for successively extracting the fruits to be squashed, a cutting assembly 5 and a squashing assembly 6, a juice removal station 7, a control unit 8 and a coin or token operated device 9.

The storage unit 2 is constituted by a carousel 10 rotatably mounted about a hollow vertical column 11 in which a plurality of column-like containers 14 for fruits 3 are distributed along at least one circumference 12 (in the illustrated case there is also a second circumference 13); said containers 14 are advantageously defined by vertical metallic ribs rigidly associated with one another by horizontal rings; in practice the carousel 10 comprises a lower disk 15 and an upper one 16 which are rigidly associated with one another and are traversed by holes for the insertion coupling of the containers 14.

The disk 15 is affected by an external set of teeth 17, and a sprocket 18, actuated by a motor-reduction unit 19, meshes against said set of teeth.

A fixed base 20 is arranged immediately below the lower disk 15 and has two respective through holes 21, 22 arranged at a distance from the axis of rotation of the carousel equal to the radii of the circumferences 12 and 13.

A disk 23 for stopping the fall of the fruits is arranged below the base 20 at a distance slightly greater than the diameter of the largest fruits, and has a fruit discharge hole 24 arranged in an offset position with respect to the vertical of the holes 21, 22.

A plate 25 is mounted rotatably about an axis indicated by 25a between the base 20 and the disk 23, and its outer edge 26 is toothed so as to engage a sprocket 27 actuated by a motor-reduction unit assembly; the plate 25 is traversed by at least one hole 28 (three in the illustrated case) which is adapted to transfer the fruits from a position underlying the hole 21 or 22 to a position underlying the hole 24 as the plate rotates.

The cutting assembly 5 comprises a substantially parallelepipedal fixed mounting 29, on a face whereof there are two cylindrical seats 30a, 30b which have parallel horizontal axes and are mutually tangent along a vertical plane indicated by P; the seats 30 are centrally connected to a fruit descent duct 31 which is symmetrical with respect to P and has its upper inlet arranged below the hole 24 of the disk 23; at their base, the seats 30 are connected to respective cylindrical holes 32 which are connected to juice removal ducts 33; the seats 30 are connected, at their sides, to peel discharge outlets or openings 34.

Two respective drums 35 are mounted in the seats 30 and are counter-rotatingly actuated (arrows A) by a motor-reduction unit assembly not illustrated in the figure; on their outer surfaces, the drums have substantially hemispherical cups 36 (three cavities each) around which grooves 36a for gaskets 36b of the kind known as O-ring are provided to define a seal against the surface of said grooves; a blade 37 is mounted immediately below the line of tangency of the seats 30, for cutting in two halves the citrus fruits which are pressed downward by the rotation of the drums; the region which supports the blade is advantageously constituted by a sort of wedge with a circular base and with curved walls which can be inserted from below in a hole of the fixed mounting aligned with the duct 31.

Four vertical guiding columns 38 are fixed below the fixed mounting 29 and support a slider 40 in a vertically slidable manner by means of ball bearings 39; said slider 40 is operatively connected to the mounting 29 by means of a large screw 41 which is rotatably actuated by means of a motor-reduction unit assembly, not illustrated in the figure, which is fixed to the slider; said large screw screws into a nut rigidly associated with the mounting so that the rotation of the motor in one direction or the other raises or lowers the slider (arrows D or E).

Two small shafts 43 are rotatably mounted in the slider by means of bearings 42, and toothed wheels 44 are keyed on said shafts and are rotatably supported by a sprocket 47 by means of a geared reduction unit 45, 46; said sprocket is associated with an electric motor 48 adapted to slowly rotate the shafts as indicated by the arrow F.

Two externally grooved heads 49 are keyed above the shafts which are arranged on the axes of the cylindrical holes 32 and have, at their base, annular grooves 50 for sealing gaskets 51 of the kind known as O-ring.

The rise of the slider 40, combined with the rotation of the heads, is adapted to squash the two half-oranges contained in the cups 36; the juice cannot escape from the side of the cups by virtue of the gaskets 36b, or from below the holes 32 by virtue of the gaskets 51, and therefore flows along the ducts 33 which connect to a duct 52 which leads to the juice dose removal station.

The ducts 33 are provided tangentially to the discharge holes 32 so that a pumping effect for the juice and for the washing water is obtained as the heads rotate.

Ports 53 are provided on the bottom of the cups 36, and nozzles 54 can be fixed thereat; the ports are connected to a central water dispenser 55 which is in turn connected to a delivery of pressurized water (which can be constituted by a tank SA and by a pump).

The bases 34a of the peel discharge ports 34 are inclined to facilitate the discharge of the water and of the peels: the inlet of the ports 34 advantageously has coupling elements of any kind for disposable bags SP for collecting the peels and the washing water.

The heads 49 are also washed after a certain period has elapsed since the last squashing was performed; in order to limit water consumption, the washing is performed starting with the head lowered and by injecting an amount of water through the nozzle 54; said water cleans the inner surface 36 as it descends and collects at 32: at this point the head is rotated, possibly at high speed, and is then raised to remove the dregs; as the head rises, the water and dregs are expelled through 33 and 52. The washing water is conveyed through 52 towards a possibly disposable tank SB, and said tank is mounted below the removal region 7 so as to also wash said region: another discharge may be provided as an alternative to 52 so that it does not pass through 7 and can be opened while 52 is closed by a two-way valve to wash the region 7 only with clean water.

The assembly for placing the individual tumblers 56 in the station 7 may be of any known kind: in order to make the machine more compact (i.e. to reduce its height), the magazine 70 of empty tumblers (schematically illustrated in the figure) may be accommodated inside the hollow column 11. The heads 49 are externally affected by longitudinal grooves 57, have rounded corners 58 and have a cambered penetration front 59; the grooves taper at the center of said front 59.

The head 49 is axially provided with a dead hole 60 which has first and second diametrical expansions, respectively 61 and 62, at its base; a bottom 64 may be fixed to the bottom of the head with screws for the threaded holes 63; said bottom 64 is centrally provided with a square hole for the passage of a stem with square cross-section 65 which extends axially with a large-diameter portion 66 and with a portion 67 having a more reduced diameter.

A helical compression spring 68 is arranged between the portion 66 and the end of the diametrical expansion 61; said spring is adapted to press the head 49 upwards and to allow a slight balanced descent thereof during squashing to limit the damage to the carpellary membranes of the segments of the fruit, which can thus deposit on the hollow bottom of the half-orange, containing part of any possible seeds: during squashing, the spring 68 avoids the extraction from the peel of essential oils, limonic acid and limonin which give the juice a sour and bitter taste.

As particularly shown in FIG. 7, a flange 71 is sealingly mounted in the first portion of the duct 52, and a rectangular or rather horizontal elongated and substantially bean-like opening 72 is provided therein. A plurality of vertical through holes 73 is defined in the flange 71 at the lower side of said opening, and respective mutually parallel thin cylindrical teeth 74 are slidably mounted in said holes.

Respective sealing rings 75 for retaining the juice as the teeth slide are advantageously provided at the inlets of the holes. The lower ends of the teeth are rigidly associated (for example screwed in parallel threaded holes) with a body 77 so as to define a sort of comb 76 with straight cylindrical teeth.

Two vertically rising rod 78a, 78b are associated with the two sides of the body 77 and are upwardly connected to one another by a crosspiece 79; said crosspiece 79 is associated with the end of a movable piston 80 of a fluidodynamic jack 81 with a vertical axis which moves the teeth upwards or downward (arrows G, H).

The operation of this movable filtering system is as follows: once the jack is actuated in the direction of the arrow G, the teeth traverse the opening 72 in a filtering configuration, i.e. the solid or semi-solid residuals contained in the juice are stopped by the teeth as said juice flows.

Once the juice has been filtered, the jack lowers the teeth in the direction of the arrow H in an extracted configuration to free the opening and to wash the duct: with said configuration of the teeth the residuals are no longer retained by said teeth and are easily removed by the washing water to be conveyed to the storage devices for the peels and for said washing water.

A narrow free space advantageously remains at the upper end of the stroke between the teeth and the top of the opening for the emergency discharge of the fluid.

A vibrator, not illustrated in the figure, is fixed to the storage unit at the regions affected by the holes 21 and 22 and is adapted to remove the fruits of the container 14 if they jam with one another and block the descent: a sensor (photocell) S1 is arranged below the holes 21 and 22 and is aligned therewith, detecting if there are any fruits on the disk 23; two sensors S2, S3 are provided at and on the vertical of the holes 21 and 22 are provided to detect the presence of fruits (the signal detection directions being indicated in the figure for the sensors S1, S2, S3) and control the vibrator, which intervenes if the sensor S1 detects the absence of fruits while at least one of the sensors S2, S3 detects the presence of citrus fruits.

If instead S1 detects the presence of fruits and S2, S3 detect their absence, the motor is actuated so as to rotate the magazine by one step to move a new hollow column 14 of the outer circumference 12 or of the inner one 13 so as to discharge.

The washing cycle which moves the drums 35, the slider 40, the heads 49 and the water feed assembly in succession is operatively associated with a timer which activates the cycle for washing all the cups of the drums a certain time after the delivery of the last squash (said time being determined on a case-by-case basis according to the environmental conditions to avoid the excessive drying or desiccation of the dirt, thus becoming difficult to remove).

A sensor S4 is also provided to detect the juice in the tumbler to ensure the delivery of a minimal amount of juice.

The refrigerating system of the fruit storage unit has not been illustrated as it is of a known type: said system is in any case controlled by a sensor for detecting the temperature of the fruits and is conveniently accommodated at the base of the machine together with the water tank, the washing pump, the tank and the disposable bags for the washing water and the peels.

The electric circuit operating the machine may be any as far as the individual fruits are successively cut and squashed in a fully automatic manner immediately before they are dispensed and that the fruits are refrigerated before they are squashed.

The storage unit 2 advantageously has a cover 69 which is at least frontally transparent so as to make the contents clearly visible and has at least one removable portion to supply citrus fruits in the column-shaped containers 14.

It has thus been observed that the invention achieves the proposed aims.

The invention thus conceived is susceptible to numerous modifications and variations, all of which are within the scope of the inventive concept.

All the details may furthermore be replaced with other technically equivalent ones.

In practice the materials employed, as well as the shapes and dimensions, may be any according to the requirements without thereby abandoning the scope of the protection of the following claims.

I claim:

1. Fruit juice automatic dispenser, comprising a fruit storage unit, fruit transferal means for successively transferring individual fruits from said fruit storage unit to a cutting assembly for cutting individual fruits into fruit halves, a squashing assembly for extracting juice from fruit halves, washing means for washing said squashing assembly, juice conveying means for conveying juice to a removal area, washing water collection means, fruit peel collection means, and a control unit means for operatively controlling said dispenser, said fruit storage unit comprising a carousel being stepwise rotatably driven about a vertical axis, said carousel comprising a carousel base means and a plurality of column-like container means being arranged at least along at least one circumference of said carousel base means, said carousel base means defining a plurality of fruit through holes, each one of said plurality of fruit through holes being arranged below one of said plurality of column-like container means for allowing individual fruits to fall therethrough, said fruit transferal means comprising a fixed base means being arranged below said carousel base means and defining at least one fixed through hole for allowing individual fruits to fall therethrough, said fruit transferal means furthermore comprising a rotating plate means being rotatably driven about a plate axis and a disk stopper means defining at least one fruit discharge hole, said at least one fruit discharge hole being arranged offset with respect to said at least one fixed through hole, said disk stopper means being arranged below said fixed base means at a distance such as to allow large size fruits to fit therebetween, said rotating plate means being interposed between said fixed base means and said disk stopper means and defining at least one plate through hole means, said at least one plate through hole means being arrangeable upon rotation below said at least one fixed through hole of said fixed base means for receiving individual fruits therefrom and being arrangeable upon further rotation above said at least one fruit discharge hole of said disk stopper means for delivering individual fruits thereto, said at least one fruit discharge hole being operatively connected to said cutting assembly.

2. Dispenser according to claim 1, wherein said fixed base means defines an upper surface, said upper surface being coated with teflon.

3. Dispenser according to claim 1, wherein said cutting assembly and said squashing assembly are mounted in a fixed mounting means, said fixed mounting means defining a pair of cylindrical seats having horizontally parallel axes and being mutually tangent along a vertical plane, said fixed mounting means defining a fruit descent duct for connecting said fruit transferal means downwardly therefrom with said pair of cylindrical seats substantially at said vertical plane, said fixed mounting means defining a pair of cylindrical holes having vertical axes, each one of said pair of cylindrical holes being arranged below and communicating with one of said pair of cylindrical seats, said fixed mounting means furthermore defining a pair of peel discharge outlets, each one of said pair of peel discharge outlets being laterally arranged from and communicating with one of said pair of cylindrical seats, a pair of counter-rotatingly actuated drums being mounted in said pair of cylindrical seats, at least one substantially hemispherical fruit holding cup being defined in each one of said pair of counter-rotatingly actuated drums, said cutting assembly comprising a blade means being mounted in said fixed mounting means along said vertical plane directly below a tangency of said pair of cylindrical seats, said pair of counter-rotatingly actuated drums being mutually actuated such that each said at least one substantially hemispherical fruit holding cup of each said pair of counter-rotatingly actuated drums meets at said vertical plane to hold individual fruits and furthermore cut individual fruits into fruit halves by means of said blade means arranged downwardly therefrom, said squashing assembly comprising a pair of grooved heads rotatably drivenly mounted on a vertically movably actuated slider means arranged below said fixed mounting means, each one of said pair of grooved heads being accommodated in one of said pair of cylindrical holes defined in said fixed mounting means, said cylindrical holes being connected to said juice conveying means comprising a pair of juice removal ducts.

4. Dispenser according to claim 3, wherein sealing means are arranged between said pair of grooved heads and said pair of cylindrical holes, said sealing means being O-ring type sealing means.

5. Dispenser according to claim 3, wherein seat means are provided in said each said pair of counter-rotatingly activated drums around said each said at least one substantially hemispherical fruit holding cup for accommodating gasket sealing means.

6. Dispenser according to claim 1, wherein said squashing assembly comprises at least one substantially hemispherical fruit holding cup and a rotatably driven grooved head being insertable therein, said washing means comprising port means being provided in said at least one substantially hemispherical fruit holding cup at a bottom thereof and nozzle means being fixed in said port means, said nozzle means being connected to presurized water delivery means.

7. Dispenser according to claim 6, wherein said presurized water delivery means comprise a water tank means and a high-pressure pump means, said washing means operating when said at least one substantially hemispherical fruit holding cup is aligned with said rotatably driven grooved head and being adapted to effectively and economically wash said squashing assembly in coordination with rising and rotational motions of said rotatably driven grooved head.

8. Dispenser according to claim 3, wherein said fruit descent duct has an inlet end being arranged immediately below said at least one fruit discharge hole of said disk stopper means of said fruit transferal means.

9. Dispenser according to claim 1, wherein said fruit transferal means is provided with a vibrator means for eliminating any mutual jamming of fruits.

10. Dispenser according to claim 3, wherein said pair of juice removal ducts are convergingly connected to a juice removal main duct means, an opening means being mounted in said juice removal main duct means and being traversed by a plurality of teeth of a comb-like means, said plurality of teeth being slidably movable in opening means between a filtering configuration, in which said plurality of teeth substantially fully transverse said opening means, and a washing configuration, in which said plurality of teeth are substantially extracted from said opening means.

11. Dispenser according to claim 10, wherein said opening means has a horizontal elongated shape, said plurality of teeth sealingly cross said opening means at a lower side thereof.

12. Dispenser according to claim 10, wherein said comb-like means is associated with a piston of a vertical-axis hydraulic jack means.

13. Dispenser according to claim 1, further comprising a coin operated device for activating said control unit.

14. Fruit juice automatic dispenser, comprising a fruit storage unit, fruit transferal means for successively transferring individual fruits from said fruit storage unit to a cutting assembly for cutting individual fruits into fruit halves, a squashing assembly for extracting juice from fruit halves, washing means for washing said squashing assembly, juice conveying means for conveying juice to a removal area, washing water collection means, fruit peel collection means, and a control unit means for operatively controlling said dispenser, said cutting assembly and said squashing assembly being mounted in a fixed mounting means, said fixed mounting means defining a pair of cylindrical seats having horizontally parallel axes and being mutually tangent along a vertical plane, said fixed mounting means defining a fruit descent duct for connecting said fruit transferal means downwardly therefrom with said pair of cylindrical seats substantially at said vertical plane, said fixed mounting means defining a pair of cylindrical holes having vertical axes, each one of said pair of cylindrical holes being arranged below and communicating with one of said pair of cylindrical seats, said fixed mounting means furthermore defining a pair of peel discharge outlets, each one of said pair of peel discharge outlets being laterally arranged from and communicating with one of said pair of cylindrical seats, a pair of counter-rotatingly actuated drums being mounted in said pair of cylindrical seats, at least one substantially hemispherical fruit holding cup being defined in each one of said pair of counter-rotatingly actuated drums, said cutting assembly comprising a blade means being mounted in said fixed mounting means along said vertical plane directly below a tangency of said pair of cylindrical seats, said pair of counter-rotatingly actuated drums being mutually actuated such that each said at least one substantially hemispherical fruit holding cup of each said pair of counter-rotatingly actuated drums meets at said vertical plane to hold individual fruits and furthermore cut individual fruits into fruit halves by means of said blade means arranged downwardly therefrom, said squashing assembly comprising a pair of grooved heads rotatably drivenly mounted on a vertically movably actuated slider means arranged below said fixed mounting means, each one of said pair of grooved heads being accommodated in one of said pair of cylindrical holes defined in said fixed mounting means, said cylindrical holes being connected to said juice conveying means comprising a pair of juice removal ducts.

15. Dispenser according to claim 14, wherein said fruit storage unit comprises a carousel being stepwise rotatably driven about a vertical axis, said carousel comprising a carousel base means and a plurality of column-like container means being arranged at least along at least one circumference of said carousel base means, said carousel base means defining a plurality of fruit through holes, each one of said plurality of fruit through holes being arranged below one of said plurality of column-like container means for allowing individual fruits to fall therethrough, said fruit transferal means comprising a fixed base means being arranged below said carousel base means and defining at least one fixed through hole for allowing individual fruits to fall therethrough, said fruit transferal means furthermore comprising a rotating plate means being rotatably driven about a plate axis and a disk stopper means defining at least one fruit discharge hole, said at least one fruit discharge hole being arranged offset with respect to said at least one fixed through hole, said disk stopper means being arranged below said fixed base means at a distance such as to allow large size fruits to fit therebetween, said rotating plate means being interposed between said fixed base means and said disk stopper means and defining at least one plate through holes means, said at least one plate through hole means being arrangeable upon rotation below said at least one fixed through hole of said fixed base means for receiving individual fruits therefrom and being arrangeable upon further rotation above said at least one fruit discharge hole of said disk stopper means for delivering individual fruits thereto, said at least one fruit discharge hole being operatively connected to said cutting assembly.

16. Dispenser according to claim 15, wherein said fixed base means defines an upper surface, said upper surface being coated with teflon.

17. Dispenser according to claim 14, wherein sealing means are arranged between said pair of grooved heads and said pair of cylindrical holes, said sealing means being O-ring type sealing means.

18. Dispenser according to claim 14, wherein seat means are provided in said each said pair of counter-rotatingly activated drums around said each said at least one substantially hemispherical fruit holding cup for accommodating gasket sealing means.

19. Dispenser according to claim 14, wherein said squashing assembly comprising at least one substantially hemispherical fruit holding cup and a rotatably driven grooved head being insertable therein, said washing means comprising port means being provided in said at least one substantially hemispherical fruit holding cup at a bottom thereof and nozzle means being fixed in said port means, said nozzle means being connected to pressurized water delivery means.

20. Dispenser according to claim 19, wherein said pressurized water delivery means comprise a water tank means and a high-pressure pump means, said washing means operating when said at least one substantially hemispherical fruit holding cup is aligned with said rotatably driven grooved head and being adapted to effectively and economically wash said squashing assembly in coordination with rising and rotational motions of said rotatably driven grooved head.

21. Dispenser according to claim 14, wherein said fruit storage unit comprises a carousel being stepwise rotatably driven about a vertical axis, said carousel comprising a carousel base means and a plurality of column-like container means being arranged at least along at least one circumference of said carousel base means, said carousel base means defining a plurality of fruit through holes, each one of said plurality of fruit through holes being arranged below one of said plurality of column-like container means for allowing individual fruits to fall therethrough, said fruit transferal means comprising a fixed base means being arranged below said carouse base means and defining at least one fixed through hole for allowing individual fruits to fall therethrough, said fruit transferal means furthermore comprising a rotating plate means being rotatably driven about a plate axis and a disk stopper means defining at least one fruit discharge hole, said at least one fruit discharge hole being arranged offset with respect to said at least one fixed through hole, said disk stopper means being arranged below said fixed base means at a distance such as to allow large size fruits to fit therebetween, said rotating plate means being interposed between said fixed base means and said disk stopper means and defining at least one plate through hole means, said at least one plate through hole means being arrangeable upon rotation below said at least one fixed through hole of said fixed base means for receiving individual fruits therefrom and being arrangeable upon further rotation above said at least one fruit discharge hole of said disk stopper means for delivering individual fruits thereto, said at least one fruit discharge hole being operatively connected to said cutting assembly, said fruit descent duct having an inlet end being arranged immediately below said at least one fruit discharge hole of said disk stopper means of said fruit transferal means.

22. Dispenser according to claim 15, wherein said fruit transferal means is provided with a vibrator means for eliminating any mutual jamming of fruits.

23. Dispenser according to claim 14, wherein said pair of juice removal ducts are convergingly connected to a juice removal main duct means, an opening means being mounted in said juice removal main duct means and being traversed by a plurality of teeth of a comb-like means, said plurality of teeth being slidably movable in said opening means between a filtering configuration, in which said plurality of teeth substantially fully transverse said opening means, and a washing configuration, in which said plurality of teeth are substantially extracted from said opening means.

24. Dispenser according to claim 23, wherein said opening means has a horizontal elongated shape, said plurality of teeth sealingly cross said opening means at a lower side thereof.

25. Dispenser according to claim 23, wherein said comb-like means is associated with a piston of a vertical-axis hydraulic jack means.

26. Dispenser according to claim 14, further comprising a coin operated device for activating said control unit.

27. Fruit juice automatic dispenser, comprising a fruit storage unit, fruit transferal means for successively transferring individual fruits from said fruit storage unit to a cutting assembly for cutting individual fruits into fruit halves, a squashing assembly for extracting juice from fruit halves, washing means for washing said squashing assembly, juice conveying means for conveying juice to a removal area, washing water collection means, fruit peel collection means, and a control unit means for operatively controlling said dispenser, said squashing assembly comprising at least one substantially hemispherical fruit holding cup and a rotatably driven grooved head being insertable therein, said washing means comprising port means being provided in said at least one substantially hemispherical fruit holding cup at a bottom thereof and nozzle means being fixed in said port means, said nozzle means being connected to presurized water delivery means.

28. Dispenser according to claim 27, wherein said fruit storage unit comprises a carousel being stepwise rotatably driven about a vertical axis, said carousel comprising a carousel base means and a plurality of column-like container means being arranged at least along at least one circumference of said carousel base means, said carousel base means defining a plurality of fruit through holes, each one of said plurality of fruit through holes being arranged below one of said plurality of column-like container means for allowing individual fruits to fall therethrough, said fruit transferal means comprising a fixed base means being arranged below said carousel base means and defining at least one fixed through hole for allowing individual fruits to fall therethrough, said fruit transferal means furthermore comprising a rotating plate means being rotatably driven about a plate axis and a disk stopper means defining at least one fruit discharge hole, said at least one fruit discharge hole being arranged offset with respect to said at least one fixed through hole, said disk stopper means being arranged below said fixed base means at a distance such as to allow large size fruits to fit therebetween, said rotating plate means being interposed between said fixed base means and said disk stopper means and defining at least one plate through hole means, said at least one plate through hole means being arrangeable upon rotation below said at least one fixed through hole of said fixed base means for receiving individual fruits therefrom and being arrangeable upon further rotation above said at least one fruit discharge hole of said disk stopper means for delivering individual fruits thereto, said at least one fruit discharge hole being operatively connected to said cutting assembly.

29. Dispenser according to claim 28, wherein said fixed base means defines an upper surface, said upper surface being coated with teflon.

30. Dispenser according to claim 27, wherein said cutting assembly and said squashing assembly are mounted in a fixed mounting means, said fixed mounting means defining a pair of cylindrical seats having horizontally parallel axes and being mutually tangent along a vertical plane, said fixed mounting means defining a fruit descent duct for connecting said fruit transferal means downwardly therefrom with said pair of cylindrical seats substantially at said vertical plane, said fixed mounting means defining a pair of cylindrical holes having vertical axes, each one of said pair of cylindrical holes being arranged below and communicating with one of said pair of cylindrical seats, said fixed mounting means furthermore defining a pair of peel discharge outlets, each one of said pair of peel discharge outlets being laterally arranged from and communicating with one of said pair of cylindrical seats, a pair of counter-rotatingly actuated drums being mounted in said pair of cylindrical seats, at least one substantially hemispherical fruit holding cup being defined in each one of said pair of counter-rotatingly actuated drums, said cutting assembly comprising a blade means being mounted in said fixed mounting means along said vertical plane directly below a tangency of said pair of cylindrical seats, said pair of counter-rotatingly actuated drums being mutually actuated such that each said at least one substantially hemispherical fruit holding cup of each said pair of counter-rotatingly actuated drums meets at said vertical plane to hold individual fruits and furthermore cut individual fruits into fruit halves by means of said blade means arranged downwardly therefrom, said squashing assembly comprising a pair of grooved heads rotatably drivenly mounted on a vertically movably actuated slider means arranged below said fixed mounting means, each one of said pair of grooved heads being accommodated in one of said pair of cylindrical holes defined in said fixed mounting means, said cylindrical holes being connected to said juice conveying means comprising a pair of juice removal ducts.

31. Dispenser according to claim 30, wherein sealing means are arranged between said pair of grooved heads and said pair of cylindrical holes, said sealing means being O-ring type sealing means.

32. Dispenser according to claim 30, wherein seat means are provided in said each said pair of counter-rotatingly activated drums around said each said at least one substantially hemispherical fruit holding cup for accommodating gasket sealing means.

33. Dispenser according to claim 27, wherein said pressurized water delivery means comprise a water tank means and a high-pressure pump means, said washing means operating when said at least one substantially hemispherical fruit holding cup is aligned with said rotatably driven grooved head and being adapted to effectively and economically wash said squashing assembly in coordination with rising and rotational motions of said rotatably driven grooved head.

34. Dispenser according to claim 27, wherein said cutting assembly and said squashing assembly are mounted in a fixed mounting means, said fixed mounting means defining a pair of cylindrical seats having horizontally parallel axes and being mutually tangent along a vertical plane, said fixed mounting means defining a fruit descent duct for connecting said fruit transferal means downwardly therefrom with said pair of cylindrical seats substantially at said vertical plane, said fixed mounting means defining a pair of cylindrical holes having vertical axes, each one of said pair of cylindrical holes being arranged below and communicating with one of said pair of cylindrical seats, said fixed mounting means furthermore defining a pair of peel discharge outlets, each one of said pair of peel discharge outlets being laterally arranged from and communicating with one of said pair of cylindrical seats, a pair of counter-rotatingly actuated drums being mounted in said pair of cylindrical seats, at least one substantially hemispherical fruit holding cup being defined in each one of said pair of counter-rotatingly actuated drums, said cutting assembly comprising a blade means being mounted in said fixed mounting means along said vertical plane directly below a tangency of said pair of cylindrical seats, said pair of counter-rotatingly actuated drums being mutually actuated such that each said at least one substantially hemispherical fruit holding cup of each said pair of counter-rotatingly actuated drums meets at said vertical plane to hold individual fruits and furthermore cut individual fruits into fruit halves by means of said blade means arranged downwardly therefrom, said squashing assembly comprising a pair of grooved heads rotatably drivenly mounted on a vertically movably actuated slider means arranged below said fixed mounting means, each one of said pair of grooved heads being accommodated in one of said pair of cylindrical holes defined in said fixed mounting means, said cylindrical holes being connected to said juice conveying means comprising a pair of juice removal ducts, said fruit descent duct having an inlet end being arranged immediately below said at least one fruit discharge hole of said disk stopper means of said fruit transferal means.

35. Dispenser according to claim 28, wherein said fruit transferal means is provided with a vibrator means for eliminating any mutual jamming of fruits.

36. Dispenser according to claim 30, wherein said pair of juice removal ducts are convergingly connected to a juice removal main duct means, an opening means being mounted in said juice removal main duct means and being traversed by a plurality of teeth of a comb-like means, said plurality of teeth being slidably movable in said opening means between a filtering configuration, in which said plurality of teeth substantially fully transverse said opening means, and a washing configuration, in which said plurality of teeth are substantially extracted from said opening means.

37. Dispenser according to claim 36, wherein said opening means has a horizontal elongated shape, said plurality of teeth sealingly cross said opening means at a lower side thereof.

38. Dispenser according to claim 36, wherein said comb-like means is associated with a piston of a vertical-axis hydraulic jack means.

39. Dispenser according to claim 27, further comprising a coin operated device for activating said control unit.

* * * * *